United States Patent [19]
Phillips

[11] Patent Number: 5,475,976
[45] Date of Patent: Dec. 19, 1995

[54] METHOD AND APPARATUS FOR REDUCTION OF FLUID BORNE NOISE IN HYDRAULIC SYSTEMS

[75] Inventor: Edward H. Phillips, Troy, Mich.

[73] Assignee: Techco Corporation, Southfield, Mich.

[21] Appl. No.: 236,483

[22] Filed: Apr. 29, 1994

[51] Int. Cl.⁶ .................. F16D 31/02; F01N 1/10
[52] U.S. Cl. .................. 60/327; 60/469; 181/252; 181/256
[58] Field of Search ............ 60/469, 327; 417/540, 417/312; 138/26; 181/252, 256

[56] References Cited

U.S. PATENT DOCUMENTS

| | | | |
|---|---|---|---|
| 3,018,799 | 1/1962 | Volkmann et al. | 138/26 |
| 3,323,305 | 6/1967 | Klees | 60/469 |
| 3,655,059 | 4/1972 | Johnson | 138/26 X |
| 4,067,195 | 1/1978 | Malecha | 60/469 |
| 4,600,035 | 7/1986 | Sugimura | 138/26 X |
| 4,671,380 | 6/1987 | Henderson et al. | 181/252 X |
| 4,712,644 | 12/1987 | Sun | 181/256 X |
| 5,101,930 | 4/1992 | Fargo et al. | 181/252 X |
| 5,172,729 | 12/1992 | Vantellini | 138/26 |
| 5,183,974 | 2/1993 | Wilhelm et al. | 417/312 X |

*Primary Examiner*—Edward K. Look
*Assistant Examiner*—Hoang Nguyen
*Attorney, Agent, or Firm*—Gifford, Krass, Groh, Sprinkle, Patmore, Anderson & Citkowski

[57] ABSTRACT

Method and apparatus for reduction of fluid borne noise in a hydraulic system are disclosed. An improved isolating hose assembly comprising first and second volumetrically compliant members with an inductive flow member providing fluidic coupling therebetween is disclosed. The improved isolating hose assembly acts similarly to an electronic low pass Π filter network in deterring fluid borne noise from entering portions of the hydraulic system located therebeyond. In addition, a sound barrier comprising a heavy-walled boot surrounding the first volumetrically compliant member is disclosed. The heavy-walled boot surrounding the first volumetrically compliant member acts to prevent acoustic sound sourced at the wall surface thereof from entering the surrounding atmosphere.

6 Claims, 2 Drawing Sheets

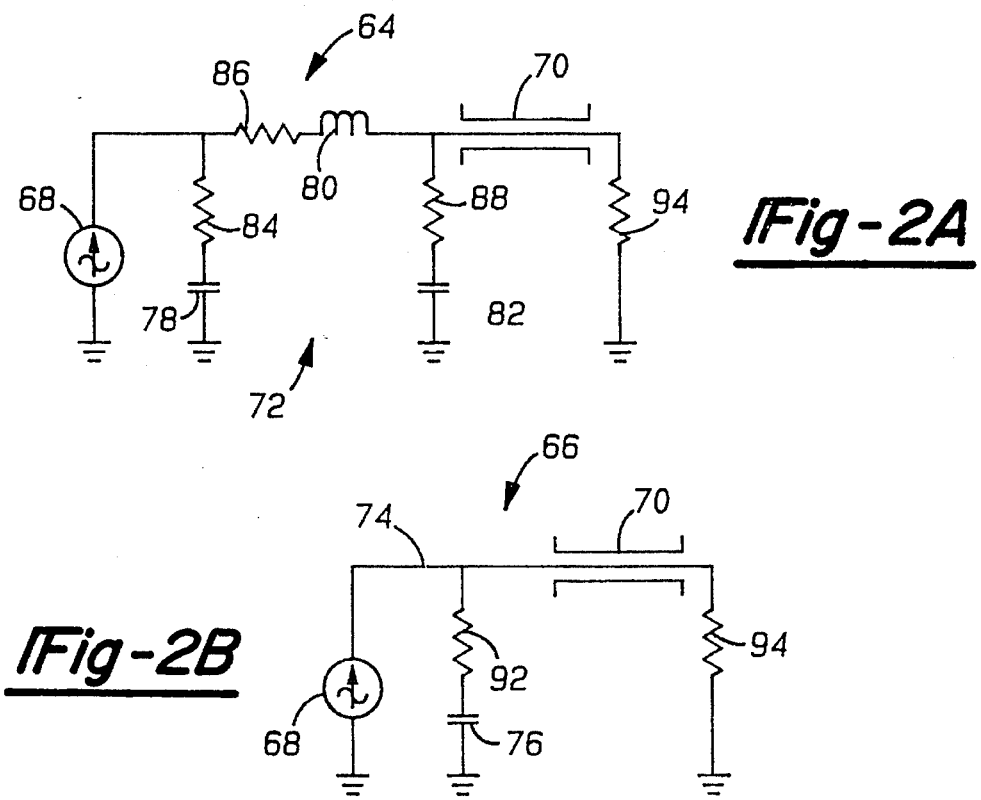
*Fig-2A*
*Fig-2B*
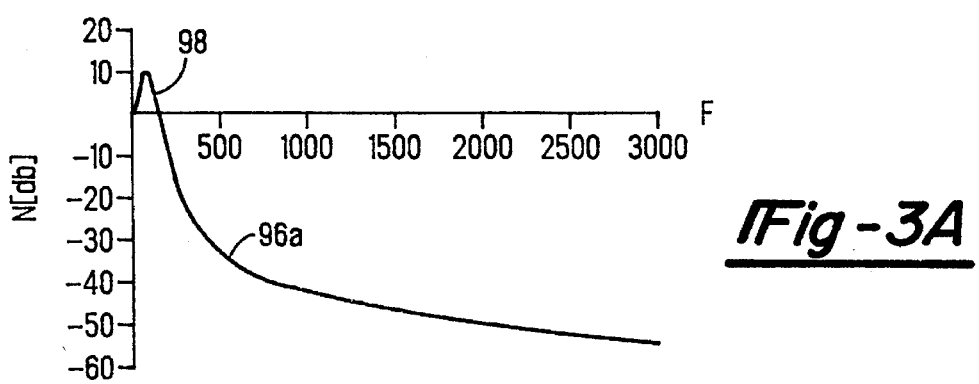
*Fig-3A*
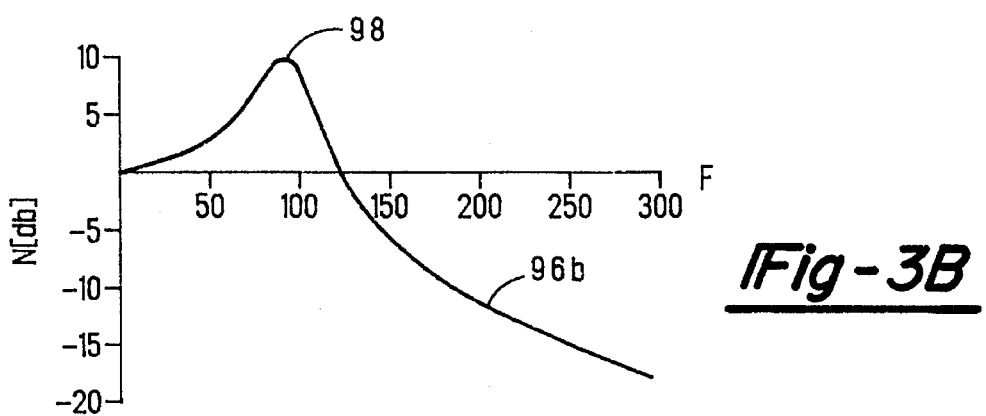
*Fig-3B*

METHOD AND APPARATUS FOR REDUCTION OF FLUID BORNE NOISE IN HYDRAULIC SYSTEMS

BACKGROUND OF THE INVENTION

I. Field of the Invention

The present invention relates generally to hydraulic systems and, more particularly, to significantly reducing fluid borne noise commonly present in such systems with particular reference to reduction of noise in vehicular power steering systems.

II. Description of the Prior Art

Fluid borne noise is commonly present in hydraulic systems powered by pumping apparatus such as gear, vane or piston pumps. Typically, the noise results when pressure waves are generated as pump flow ripple encounters system flow impedances. Flow ripple can be generated by the pumping apparatus as a combination of any, or all, of the following three types of disturbances:

1. Kinematic flow ripple, which is a function of pump geometry. By way of example, the flow output of a piston pump is generally a summation of an odd number of pistons moving in a sinusoidal manner. This results in flow ripple whose fundamental frequency is equal to the product of the pump's rotational speed and the number of pistons.

2. Compression flow ripple, which is a result of compression, or decompression, of a trapped fluid volume. Compression flow ripple is commonly encountered in gear pumps as the pump's gears mesh. This is because the gears mesh with a contact ratio greater than one whereby fluid can be trapped between succeeding sets of teeth whenever they are concomitantly in contact.

3. Leakage flow ripple, which is a result of pressure differentials across varying leakage paths formed between moving and stationary pump components.

Fluid borne noise present in a hydraulic system causes mechanical apparatus such as hydraulic lines, control valves, hydraulic motors, and supporting structural members to vibrate. In many cases such vibration is coupled to the atmosphere and is the source of objectionable acoustic noise. It is desirable to attenuate such fluid borne noise near a hydraulic system's pumping apparatus thereby isolating the rest of the system and minimizing vibration and resulting acoustic noise.

Fluid borne noise reduction apparatus of the prior art usually comprises a flexible metal tube, called a tuning cable, placed inside a section of volumetrically compliant hose. Such prior art apparatus is described in U.S. Pat. No. 3,323,305 entitled ATTENUATION DEVICE and issued to G. T. Klees in June 1967. Although such tuning cable designs are based upon destructive interference principles, their performance has never been fully analyzed. For instance, the automotive industry has resorted to empirical methods and subjective evaluations in applying the technology to vehicular power steering systems wherein its success has been marginal at best. The following quotation from SAE Technical Paper No. 931295 entitled ANALYSIS OF TUNING CABLES FOR REDUCTION OF FLUIDBORNE NOISE IN AUTOMOTIVE POWER STEERING HYDRAULIC LINES by M. C. Hastings and C. C. Chen given in May 1993 (which paper comprises mathematical techniques for analysis of the prior art technology) illustrates this point:

"The distributed parameter mathematical model does accurately predict attenuation of the pressure wave in simple (straight line) systems. In more complex systems, however, overall attenuation is a function of configuration, including the number of discontinuities and support points, and varies as a function of frequency. In real systems with many curves, bends and other discontinuities, the complex fluid-structure interaction dominates and tuning cables may have little, if any, effect on noise reduction in the frequency range of interest."

As a matter of fact, this analysis misses the mark slightly because the supposed destructive interference usually does not occur. This is for three reasons. Firstly, the pumping apparatus acts in the manner of a flow source rather than a pressure source in issuing the offending noise signal. Thus, it presents a substantially infinite source impedance to the tuning cable. Secondly, because the tuning cable is spiral wound with a discontinuous wall, it has distributed leakage therethrough. Thirdly, because the expandable nature of the volumetrically compliant hose, effective bulk modulus of fluid flowing therewithin is as much as 30 times smaller than the fluid itself. Thus, sound velocity and therefore wavelength are up to about 5.5 times less than within the tuning cable. In effect, prior art noise reduction apparatus dominantly comprises a distributed coupling of pressure to the volumetrically compliant hose which substantially acts like a continuous array of capacitors each coupled to ground.

SUMMARY OF THE INVENTION

Accordingly, the present invention is directed to method and devices for substantially eliminating fluid borne noise in hydraulic systems, and additionally for reducing concomitant coupling to the atmosphere in the form of acoustic noise. The methods and devices are particularly directed to eliminating power steering pump (hereinafter refereed to as "pump") sourced noise from vehicles comprising a power steering system.

In a vehicular power steering system its pump is generally mounted to the vehicle's engine via a suitable mounting bracket. As such, any pump sourced mechanical noise is coupled directly to the engine. And, the engine is presumed to be isolated from the vehicle in a manner that provides mechanical noise isolation. However, any fluid borne noise reaching the system's steering gear can be coupled to both a mounting subframe and the steering column wherefrom undesirable acoustic noise emanates.

In a preferred embodiment, an improved isolating hose assembly attenuates substantially all discernible fluid borne noise incident thereupon, thus effectively isolating the remainder of a host hydraulic system from its pump sourced fluid borne noise. The improved isolating hose assembly is quite simple in nature, comprising a first volumetrically compliant member followed by a relatively small diameter inductive flow member and a second volumetrically compliant member. As described below, the improved isolating hose assembly acts similarly to an electronic low pass Π filter network optimized for use with a current source.

In analyzing the improved isolating hose assembly, the pump is regarded as an alternating flow source of fluid borne noise. The first volumetrically compliant member functions like a capacitor to ground for preferentially bypassing alternating fluid flow components of a hydraulic signal. The inductive flow member functions like a series inductor for impeding further transmission of remaining alternating fluid flow components. And the second volumetrically compliant member functions like another capacitor to ground for preferentially bypassing remaining alternating fluid flow components of the hydraulic signal. A load comprising a control valve and hydraulic motor is coupled to the improved isolating hose assembly via hydraulic tubing which acts like a transmission line having relatively high characteristic impedance. Generally the load is resistive in nature, and may be of either higher or lower impedance than the hydraulic tubing.

Utilization of the improved isolating hose assembly results in significantly reduced fluid borne noise level in either the hydraulic tubing or the load over frequencies of interest. However, significant acoustic noise may still be present. This is because the first volumetrically compliant member is normally formed of volumetrically compliant hose whereby higher frequency harmonics, should they be present, can drive its surface to significant levels of vibration. Such high frequency surface vibration can be sufficient for coupling sound energy into the surrounding atmosphere in a manner similar to the action of a loudspeaker.

Therefore, in a first alternative preferred embodiment, the first volumetrically compliant member is surrounded by a non-contacting housing whose characteristic acoustic impedance differs substantially from that of the atmosphere surrounding the first volumetrically compliant member. As a result, acoustic noise is reflected inward and thus prevented from entering the surrounding atmosphere. As depicted below, the non-contacting housing is formed in the manner of a heavy-walled elastomeric boot surrounding the first volumetrically compliant member. The elastomeric boot comprises end sections adapted for attachment to fittings located at either end of the first volumetrically compliant member.

BRIEF DESCRIPTION OF THE DRAWINGS

Other objects, features and advantages of the present invention will be apparent from the written description of the drawings, in which:

FIGS. 2A and 2B are equivalent circuit diagrams useful for respectively comparing performance of the improved isolating hose assembly of the present invention with noise reduction apparatus of the prior art; and FIGS. 3A and 3B are graphs depicting improvement in fluid borne noise suppression achieved by utilizing the improved isolating hose assembly of the present invention in place of noise reduction apparatus of the prior art.

DETAILED DESCRIPTION OF THE PREFERRED EMBODIMENTS

Figure 1:
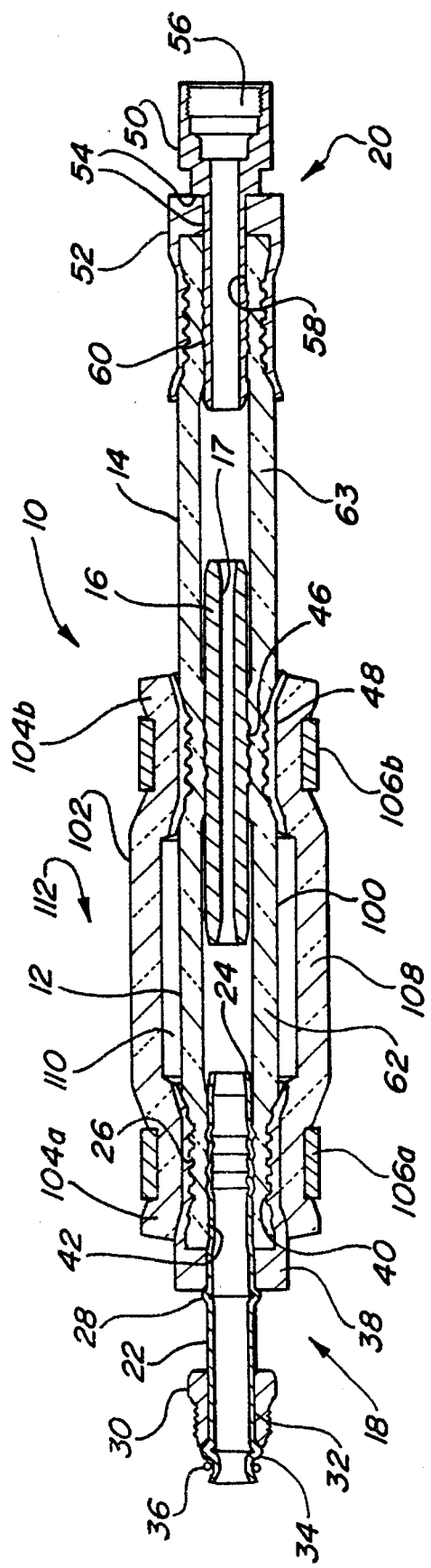
FIG. 1 is a cross-sectional view of the improved isolating hose assembly in accordance with the invention.

An improved isolating hose assembly 10 of the present invention comprising first and second volumetrically compliant members 12 and 14, respectively, and an inductive flow member 16 is shown in FIG. 1. Generally, first and second conduits or volumetrically compliant members 12 and 14, respectively, are formed of high expansion hose such as Dayco No. DF 3289 (i.e., which has a passage having an inside diameter of 0.375 in. and having walls 62 and 63 which expand to increase the volume of the passage expands by about 50% at 1,300 psi). In addition, improved isolating hose assembly 10 comprises input and output sections 18 and 20, respectively.

Input section 18 includes tubing 22 formed with a taper section 24, "ripple" section 26, and axial position locating flange 28. An internal nut 30 is positioned upon portion 32 of tubing 22, an O-ring flange 34 is formed and an O-ring 36 mounted on tubing 22. Then a first collar fitting 38 comprising internal ridges 40 is positioned over "ripple" section 26 and against axial position locating flange 28. The input section 18 is inserted in input end 42 of first volumetrically compliant member 12 and first collar fitting 38 is crimped in a known manner to form a pressure-tight connection between input end 42 and "ripple" section 26.

The inductive flow member 16 is formed in a tubular manner and comprises an external ridged section 46. It is inserted into a selected location to form a flow barrier between first and second volumetrically compliant members 12 and 14, respectively, whereby flow is conveyed to the second volumetrically compliant member 14 via bore 17 formed in inductive flow member 16. Then collar 48 is positioned over ridged section 46 and crimped as before to fixedly locate the inductive flow member 16 between first and second volumetrically compliant members 12 and 14, respectively, and make the resulting flow barrier pressure tight.

Output section 20 is depicted as a single piece formed of output fitting 50 and second collar fitting 52 joined as by brazing along line 54. As shown, output fitting 50 is formed with a female boss 56 adapted for receiving a delivery tube assembly (not shown) having an input section comprising another internal nut 30, O-ring flange 34 and O-ring 36 grouping. In any case, output section 20 is inserted in output end 58 of second volumetrically compliant member 14 and second collar fitting 52 is crimped to form a pressure-tight connection between output end 58 and ridged section 60 of output fitting 50 as before.

Operationally, improved isolating hose assembly 10 is used within a host hydraulic system as follows: O-ring flange 34 (with O-ring 36 mounted thereon) is inserted in an output boss associated with a pump (neither shown) and the rest of the host hydraulic system is connected to output fitting 50 via the delivery tube assembly. In general, the pump issues fluid flow comprising both constant and alternating flow components to the improved isolating hose assembly 10. The alternating flow component flows within the first volumetrically compliant member 12 and is preferentially bypassed out of the hydraulic system (i.e., in a manner similar to a bypass capacitor) by displacing wall 62 thereof in an alternating manner. This is due in part to further transmission of the alternating flow component being impeded by inductive flow member 16. Thus, within the improved isolating hose assembly 10, the overwhelming majority of the alternating flow component is limited to the first volumetrically compliant hose section 12. And, in the event that the impedance of the rest of the host hydraulic system, as seen from output fitting 50, is large compared with that of the second volumetrically compliant member 14, any remaining alternating flow component is preferentially confined thereto via similarly displacing wall 63.

As mentioned above, fluid borne noise reduction apparatus of the prior art acts substantially like a continuous array of capacitors, each coupled to ground while the improved isolating hose assembly 10 of the present invention acts substantially like a Π filter network. In operation, the intended purpose of either apparatus is to absorb most of the alternating flow component issuing from the pump and deter it from entering the rest of the system.

As an aid to comparing improved isolating hose assembly 10 of the present invention with fluid borne noise reduction apparatus of the prior art it is expedient to utilize equivalent circuits 64 and 66, respectively, as schematically shown in FIGS. 2A and 2B, respectively, for this purpose. In equivalent circuit 64, a current source (i.e., emulating the alternating flow component issuing from the pump) 68 is coupled to a transmission line 70 (i.e., emulating the delivery tube assembly) and a resistive load impedance 94 (i.e., emulating the control valve and hydraulic motor) via a Π filter network 72. In equivalent circuit 66, the current source 68 is coupled to the transmission line 70 and the resistive load impedance 94 via a short length of line 74 coupled to capacitor 76, respectively.

In FIG. 2A the Π filter network 72 comprises a first capacitor 78 (i.e., emulating the first volumetrically compliant member 12), inductor 80 (i.e., emulating the inductive flow member 16) and a second capacitor 82 (i.e., emulating the second volumetrically compliant member 14). In addition, the capacitors 78 and 82, and inductor 80 are depicted in series with resistors 84, 86 and 88, respectively, to account for energy loses in each of first and second volumetrically compliant members 12 and 14, and inductive flow member 16, respectively. Similarly, in FIG. 2B capacitor 76 is coupled to line 74 via a series resistor 92.

In analyzing these circuits comparatively, it is convenient to assume a value for real load impedance 94 that is matched to the characteristic impedance of the delivery line. Using such a circuit simplification results in the respective filter circuits being terminated by a resistive load equal in value to the characteristic impedance of the delivery line. The characteristic impedance of the delivery line is determined by $$Z=Sqrt[B\rho/A^2]$$

where Z is the characteristic impedance (which is a real (i.e., resistive) impedance), B is fluid bulk modulus, $\rho$ is fluid density and A is the inside cross-sectional area of the delivery line. In analyzing equivalent circuit 64 it is further convenient to break up the analysis as follows:

$$Z_1=(Z(R_3-j/\omega C_2))/(Z+R_3-j/\omega C_2),$$

$$Z_2=Z_1+R_2+j\omega L,$$

$$Z_3=(Z_2(R_1-j/\omega C_1))/(Z_2+R_1-j/\omega C_1),$$

$$P_{out}/P_{in}=Z_1/Z_3,$$

$$Z_4=(Z(R_4-j/\omega C_3))/(Z+R_4-j/\omega C_3), \text{ and}$$

$$R=Abs[(P_{out}/P_{in}) (Z_3/Z_4)]$$

where $(R_3-j/\omega C_2)$ is the series impedance of second capacitor 82 and resistor 86, $Z_1$ is the impedance of the parallel combination of Z and $(R_3-j/\omega C_2)$, $(R_2+j\omega L)$ is the series impedance of the inductor 80 and the resistor 88, $Z_2$ is the impedance looking toward the inductor 80, $(R_1-j/\omega C_1)$ is the series impedance of the first capacitor 78 and the resistor 84, $Z_3$ is the impedance of the parallel combination of $Z_2$ and $(R_1-j/\omega C_1)$, $P_{out}/P_{in}$ is the ratio of alternating pressure applied to the delivery line divided by that present applied to the first capacitor 78 (i.e., that present in the first volumetrically compliant hose section 12), $(R_4-j/\omega C_3)$ is the series impedance of the capacitor 76 and resistor 92, $Z_4$ is the impedance of the parallel combination of Z and $(R_4-j/\omega C_3)$, and R is the comparative ratio of sound pressures applied to the delivery line by equivalent circuits 64 and 66.

As is common in acoustic sound analysis, results of the foregoing are best expressed in relative decibels according to the relation 20 Log[R]. Results shown in FIGS. 3A and 3B for frequency ranges of 0 to 3,000 Hz and 300 Hz, respectively, were obtained for apparatus comprising the following parameters: $C_1$, $C_2$ and $C_3$ relate to volumetrically compliant members formed from 4, 4 and 8 inch lengths, respectively, of high expansion hose such as the afore mentioned Dayco No. DF 3289 (i.e., which has an inside diameter of 0.375 in. and expands volumetrically by 50% at 1,300 psi), L relates to an inductive flow member having a 0.1 in. diameter 4 in. in length, and the delivery line is formed of φ10 mm steel tubing which has an internal diameter of 0.277 in. Using these factors, values for each are calculated as follows:

$$C_1=C_2=(0.5/(1.25 \cdot 1300)) (4\pi 0.1875^2)=0.000136 \text{ in.}^5/\text{lb.},$$

$$C_3=2C_1=0.000272 \text{ in.}^5/\text{lb.},$$

$$L=(4\rho)/(\pi 0.05^2)=0.0397 \text{ lb.sec.}^2/\text{in.}^5, \text{ and}$$

$$Z=Sqrt[(B\rho)/(\pi 0.1385^2)^2]=46 \text{ lb.sec./in.}^5,$$

where fluid density $\rho=0.000078$ lb.sec.$^2$/in.$^4$ and fluid bulk modulus B=100,000 lb./in.$^2$. In addition, $R_1$, $R_3$, and $R_4$ are valued such that radian corner frequencies obtained with reference to $C_1$, $C_2$, and $C_3$, respectively, are each 10,000 rad./sec. which results in $R_1=R_3=0.74$ lb.sec./in.$^5$, and $R_4=1.47$ lb.sec./in.$^5$. $R_2$ is equal to the rate of the change of pressure drop across the inductive flow member 16 with respect to a change in flow rate therethrough or the differential $d\Delta P_L/dQ_L$ across the inductive flow member 16 represented by the series impedance $(R_2+j\omega L)$. Normally chosen values of fluid flow rate and geometries for the inductive flow member 16 result in a square law relationship between pressure drop and flow rate therethrough whereby $R_2$ (i.e., which is equal to $d\Delta P_L/dQ_L$) is a nominally linear function of flow rate which can be evaluated according to coefficients and equations for turbulent flow as found, for instance, in a section entitled Mechanics of Fluids found in Marks' Standard Handbook for Mechanical Engineers published by McGraw-Hill. In this case values have been chosen for which $R_2=4$ lb.sec./in.$^5$. Finally, delivery line characteristic impedance Z =46 lb.sec./in.$^5$.

Shown in FIGS. 3A and 3B are curves 96a and 96b which result from these values were used in evaluating the above equations. Curves 96a and 96b depict dramatic reduction in transmitted fluid borne noise beginning at about 133 Hz. The increased values below that frequency are due to a damped flow resonance between $C_1$ and $C_2$ via L. However, most vehicular power steering systems exhibit their first troublesome noise frequencies above 200 Hz whereat curves 96a and 96b depict effective fluid borne noise reduction.

(Although it is possible to further reduce the frequency at which unity comparative results occur by increasing either of the capacitive or inductive section lengths, such modifications may be detrimental to overall steering performance. For instance, excessive cumulative bypass capacitance values may degrade system response. Further, excessive reduction of the resonant frequency denoted by curve peak 98 could result in a form of steering shudder wherein engine driven power steering pump flow ripple is amplified. This typically would likely occur at frequencies linked to engine idle cylinder firing rates in the order of 35 Hz commonly encountered during parking maneuvers.)

As mentioned above, curves 96a and 96b depict significant reduction in fluid borne noise level over frequencies of interest obtained as a result of utilizing the improved isolating hose assembly 10 of the present invention. However, significant acoustic noise may still be present. This is because surface 100 of the first volumetrically compliant member 12 can be driven by higher frequency harmonics, should they be present, at significant vibration levels. Such high frequency surface vibration is often sufficient for coupling sound energy into the surrounding atmosphere in a manner similar to the action of a loudspeaker.

Therefore, in a first alternative preferred embodiment, first volumetrically compliant member 12 is surrounded by a non-contacting housing whose characteristic acoustic impedance differs substantially from that of the atmosphere surrounding the first volumetrically compliant member 12. In this way any acoustic noise generated is reflected inward and thus prevented from entering the surrounding atmosphere. As shown in FIG. 1, such a non-contacting housing is formed in the manner of a heavy-walled elastomeric boot 102 surrounding the first volumetrically compliant member 12. Elastomeric boot 102 comprises end sections 104a and 104b adapted for attachment to first collar fitting 38 and collar 48, respectively, as by crimping collars 106a and 106b, respectively.

Transmission of acoustic sound through elastomeric boot 102 can be analyzed according to formula (6.41) found in a book entitled FUNDAMENTALS OF ACOUSTICS by Kinsler and Frey and published by Wiley for sound transmission through three media. Because the media on either side of wall 108 of elastomeric boot 102 is identical (i.e., air) and because of the large acoustic mismatch between air and the elastomeric material comprised in wall 108, formula (6.41) can be reduced to the following:

$$\alpha_t = 4(\rho_1 B_1/\rho_2 B_2)/\mathrm{Sin}^2[\omega \mathrm{Sqrt}[\rho_2/B_2]]1$$

where $\alpha_t$ is the sound transmission coefficient from annular space 110 to exterior space 112, $\rho_1 B_1$ is the product of air density and air bulk modulus, $\omega$ is radian frequency, $\rho_2$ is elastomer density, $B_2$ is elastomer bulk modulus and 1 is elastomer thickness. When evaluated with the values $\rho_1 B_1 = 0.00158$ lb.$^2$sec.$^2$/in.$^6$, $\rho_2 = 0.000103$ lb.sec.$^2$/in.$^4$, $B_2 = 348,000$ lb./in.$^2$ and $1 = 0.25$ in., sound transmission coefficient $\alpha_t = 15,100/\omega^2$. Conversion from radian frequency $\omega$ to frequency f results in $\alpha_t = 382/f^2$. At the above noted first troublesome noise frequencies above 200 Hz, $\alpha_t$ is less than 0.01 whereby acoustic sound is reduced by a minimum value of $-20$ db with values decreasing further depending upon the square of frequency.

Combination of the above described isolating hose assembly 10 and heavy-walled elastomeric boot 102 results in a significantly improved apparatus for reduction of fluid borne noise within and acoustic noise emanating from hydraulic systems. Further reduction of fluid borne noise within and acoustic noise emanating from such hydraulic systems (albeit obtained with diminishing returns) could be obtained by extended combinations of additional inductive flow members and volumetrically compliant members. Thus, one skilled in the art will readily recognize from such discussion, and from the accompanying drawings and claims, that various changes, modifications and variations can be made therein without departing from the spirit and scope of the invention as defined in the following claims.

I claim:

1. An apparatus for reduction of fluid borne noise in a hydraulic system, said apparatus comprising:

a first and a second conduit member, each of said first and second conduit members having a wall defining a passage having a predetermined diameter, said wall formed of a compliant material permitting volumetrical expansion of said passage in response to an increase in pressure;

an elongated inductive flow member having a bore and a pair of ends, one of said pair of ends being connected to one end of said first conduit member and an other end of said flow member being connected to one end of said second conduit member, said bore having a diameter smaller than said predetermined diameter of said passage to restrict flow of said fluid from said first conduit to said second conduit;

an input member connected to an other end of said first conduit member to permit introduction of fluid into said passage; and an output member connected to an other end of said second conduit to permit delivery of fluid to said hydraulic system.

2. The improved apparatus for reduction of fluid borne noise of claim 1, wherein each of said first and second conduit members comprise a volumetrically compliant hose section.

3. The improved apparatus for reduction of fluid borne noise of claim 1, wherein said inductive flow member comprises a tube having a bore having art end forming a flow barrier between said first and second conduit members.

4. The improved apparatus for reduction of fluid borne noise of claim 1, additionally comprising sound barrier means surrounding and spaced apart from said first conduit member for preventing acoustic sound sourced at said wall thereof from entering the surrounding atmosphere.

5. The improved apparatus for reduction of fluid borne noise of claim 4, wherein said sound barrier means comprises an elastomeric boot spaced apart from said first conduit.

6. A method for reducing fluid borne noise in hydraulic systems, said method comprising the steps of:

passing a flow of fluid through a first volumetrically compliant member to bypass alternating fluid flow components of a hydraulic signal;

passing fluid from said first compliant member through a flow barrier with an inductive flow member to impede further transmission of remaining alternating fluid flow components beyond said first volumetrically compliant member; and passing said fluid flow from said inductive flow member into a second volumetrically compliant member to remove any remaining alternating fluid flow components.

* * * * *